(12) United States Patent
Naffziger

(10) Patent No.: US 7,224,563 B2
(45) Date of Patent: May 29, 2007

(54) METHOD AND DEVICE FOR CIRCUIT CONTROL

(75) Inventor: Samuel D. Naffziger, Fort Collins, CO (US)

(73) Assignee: Hewlett-Packard Development Company, L.P., Houston, TX (US)

(*) Notice: Subject to any disclaimer, the term of this patent is extended or adjusted under 35 U.S.C. 154(b) by 655 days.

(21) Appl. No.: 10/651,360

(22) Filed: Aug. 29, 2003

(65) Prior Publication Data

US 2004/0257723 A1 Dec. 23, 2004

Related U.S. Application Data

(60) Provisional application No. 60/480,056, filed on Jun. 20, 2003.

(51) Int. Cl.
*H02H 7/00* (2006.01)

(52) U.S. Cl. .................................... 361/115; 361/90

(58) Field of Classification Search .............. 361/115, 361/103, 90
See application file for complete search history.

(56) References Cited

U.S. PATENT DOCUMENTS

| | | | |
|---|---|---|---|
| 6,762,629 B2 * | 7/2004 | Tam et al. ............... | 327/114 |
| 6,885,233 B2 * | 4/2005 | Huard et al. ............. | 327/513 |
| 6,927,605 B2 * | 8/2005 | Fetzer et al. ............ | 327/101 |
| 7,071,768 B2 * | 7/2006 | Abe et al. ............... | 327/540 |

OTHER PUBLICATIONS

U.S. Appl. No. 60/480,056, Naffziger.

* cited by examiner

*Primary Examiner*—Stephen W. Jackson (57) ABSTRACT

One disclosed embodiment of the invention is directed to circuit control that comprises sensing a delivered voltage to a portion of an integrated circuit, determining an appropriate frequency for the portion of the integrated circuit, and providing the appropriate frequency to the integrated circuit.

35 Claims, 4 Drawing Sheets

METHOD AND DEVICE FOR CIRCUIT CONTROL

CROSS-REFERENCE TO RELATED APPLICATIONS

This application claims priority to U.S. Provisional Patent Application No. 60/480,056, filed Jun. 20, 2003, entitled "A SYSTEM FOR RAPID ADAPTATION OF CLOCK FREQUENCY TO VOLTAGE TRANSIENTS."

BACKGROUND

Because of trends in process technology, scaling, and the frequency of operations for VLSI devices, power consumption has become a dominant issue in integrated circuit design. Managing power consumption is thus a high priority in the design objectives of these devices.

It is broadly recognized in the implementation of power management systems for VLSI devices that the most efficient means of power management is to simultaneously change 1) the voltage delivered to an integrated circuit, and 2) the frequency of that integrated circuit's operation. Because voltage is a primary determinant of switching speed for transistors of an integrated circuit, a designer will typically specify the maximum frequency at which a part can operate for a given voltage. Thus, for an example micro-processor, a power supply may generate a fixed voltage of 2 volts to a device and the device may be specified as operating at 2 GigaHertz (GHz). However, the design of the device has to be such that the voltage seen at the integrated circuit is never below the level that enables the full 2 GHz operation. If the voltage on the integrated circuit falls below that level, there could be a timing failure and some of the components would be unable to switch fast enough to make the 2 GHz cycle times.

But power supplies vary and electrical parasitics between the power supply and the actual transistors of an integrated circuit effect power transmission. Thus the voltage actually delivered to an integrated circuit is not a completely fixed value, but rather ripples and varies with time. On average these ripples may have a total magnitude of approximately + or −10% of the total voltage. If the intent is to deliver 2 volts to the integrated circuit, the actual delivered voltage may vary between 1.8 volts and 2.2 volts. Since the voltage in large part determines the switching speed of components, designers have to make sure that (in the current example) the device in use can still operate at 2 GHz even if the delivered voltage is 1.8 volts. This is a technique known as guardbanding. Without this guardbanding, the integrated circuit could fail when the voltage drops.

For power consumption, two relationships become important when the voltage varies. One is the relationship of the device speed to voltage; a relationship that is approximately linear. If the voltage applied to a transistor is lowered by 10%, the switching speed of that transistor is reduced by approximately 10%. A first order approximation can be shown as:

$$F \propto V \quad (1)$$

The second relationship is between power and frequency. Power (the total wattage dissipated by an integrated circuit) is equal to the switching capacitance of a device (a relatively fixed value for a given design, labeled C), multiplied by the voltage across the device squared (labeled V), and multiplied by the frequency at which the device is switching (plus a leakage term which may be disregarded here). This relationship is thus:

$$P = C \times V^2 \times F \quad (2)$$

Using the previous example, if the capacitance on a component is switching once per cycle, then the capacitance is switching at a rate of 2 GHz, (or once every 500 picoseconds). Equation 2 show that a reduction in voltage would result in a square law reduction in power. For example, when voltage (V) drops 10%, becomes 0.9×V, the square law reduction causes the power (P) to be 0.9×0.9×P, or 0.81×P (a 19% reduction).

As equation 1 indicates, frequency is directly proportional to voltage. Thus when combined with equation 2, a reduction in frequency will lead to an additional voltage factor in power reduction. This results in power being reduced by approximately $V^3$. Using the previous example, a 10% drop in V would result in a 0.9×0.9×0.9×P (0.72×P or 28%) reduction in power for a 10% reduction in voltage. This relationship is well known, and has been exploited for power management particularly in mobile devices such as laptops.

Many power-management solutions use software to minimize the excess computing power of microprocessors and other like devices. Based upon an expected load, the software determines how fast the processor must operate; for example, the software may note that a densely coded application may require more speed than a simple one. Once the software determines the speed required by the demand, it can reduce the speed to only that which is required. The result is a reduction in the power consumption for the device over time.

However, these methods lead to inefficiencies in voltage management. For example, these methods require that a software program predict the computing demands an integrated circuit may see and then change the voltage and frequency accordingly. This results in lag times associated with prediction inaccuracies. Further, the intention of these systems is to minimize the total energy consumed over time for the processor. Portable units, such as laptops, can then maximize the battery life with these algorithms. For a server type processor, minimizing total energy usage over a period of time is not the goal. Maximum computing power is the goal. Within a given power envelope, a server system should maximize the performance that is available on demand for a customer. Ideally, the full performance capability should be available at any time to a customer. Even in server systems, however, there are significant motivations for keeping the power down. For example, as a chip burns power it generates heat that is difficult to draw away from a small silicon die. Further, it is more expensive to run a large number of processors at higher power, and it is difficult to provide that power in tight spaces. Thus, for a server, a system that only tries to minimize power when the compute needs are high does not suffice; the compute needs are always high. Likewise, a system that simply provides maximum computing power is insufficient for most systems. Thus, there exists a need for a method that actively optimizes the power consumed while maintaining the system's ability to deliver the highest performance without having to rely on software predictions that are often inaccurate.

An additional shortcoming of currently available solutions is the time lag between the recognition that an opportunity to reduce power (or the recognition of the need to increase power due to high compute needs) and the operation that effects that change. After recognition, a command to vary voltage must be sent out to a voltage regulator which generates the voltage used by the processor. It then takes a number of microseconds (10s to 100s of microseconds, typically) for the voltage regulator to perform that task. It is not until that voltage transition is completed that the frequency can actually be raised on the processor itself, because a processor running at a frequency higher than the voltage supports can result in a timing failure. Thus, there is a time lag waiting for the voltage to slew before the frequency can be raised. Similarly, in order to lower the voltage (to reduce the power consumption) the frequency must be lowered first to avoid a timing failure caused by a voltage too low for a given frequency. A system that understood exactly how fast the integrated circuit could operate for a given voltage, combined with a system that could operate the chip at a frequency matched to that voltage, would result in a significant efficiency gains. Instead of anticipating a voltage reduction and lowering frequency in advance, such a system could lower voltage and frequency together. Such a system could also avoid the guardbanding necessary when a designer is required to anticipate the varying operating conditions of a device. If, using the above example, the voltage varies by + or −10%, a designer must ensure that the device will work at its quoted frequency if only 90% of the expected voltage is provided. Thus, there exists a need for a system that could set the frequency to an observed voltage and constantly vary the frequency to match the voltage actually delivered.

In order to further improve efficiencies, many power-management systems shut off parts of an integrated circuit that are not in use. For example, the floating point computation unit in a microprocessor is a high performance unit that is needed for technical code. For many applications (word processing, transaction processing, and other general integer applications) the floating point computation is unnecessary. A typical power-savings method might shut the clock down to the floating point unit so that it is not using power. But as units on an integrated circuit are powered up and down, the processor can experience large, sudden changes in power consumption. This poses a challenge to the power delivery system, because there is always some resistance and some inductance between the components and the power supply. Further, a sudden spike in power to dormant areas can result in a voltage drop to already powered sections that can cause operational and timing problems. Thus, there exists a need for a system that can adapt very rapidly to changes in voltage induced by sudden changes in power consumption.

SUMMARY

One disclosed embodiment of the invention is directed to circuit control that comprises sensing a delivered voltage to a portion of an integrated circuit, determining an appropriate frequency for the portion of the integrated circuit, and providing the appropriate frequency to the integrated circuit.

BRIEF DESCRIPTION OF THE DRAWINGS

For a more complete understanding of the present invention, reference is now made to the following descriptions taken in conjunction with the accompanying drawing, in which.

DETAILED DESCRIPTION

Voltage sensors, such as those described in patent application Ser. No. 10/614,309, hereby incorporated by reference, can provide a means of detecting the voltage actually delivered to an integrated circuit. Often, the power consumption of different points on a integrated circuit will vary, resulting in a drop in voltage in one part of a integrated circuit that are not seen elsewhere. It may be advantageous to have a number of voltage sensors distributed across an entire die. Circuitry arranged to provide a determined frequency, such as a fast response frequency synthesizer as described in patent application Ser. No. 10/679,725, hereby incorporated by reference, can provide the ability to quickly adjust a clock frequency that drives a particular section of an integrated circuit. A frequency determining means is used to determine what frequency is appropriate for the integrated circuit (or a portion thereof) at the voltage delivered.

Figure 1:
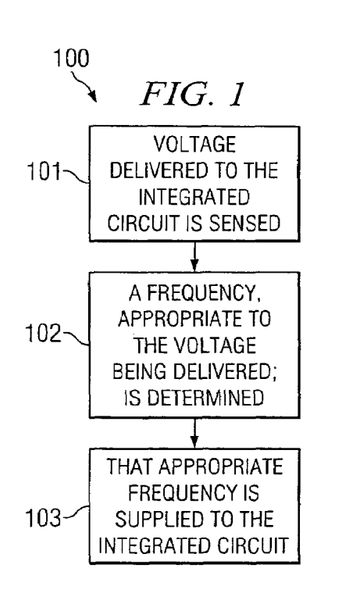
FIG. 1 is a flow chart of an embodiment of the present invention.

FIG. 1 depicts a flow chart 100 describing the basic stages of certain embodiments of the present invention. In stage 101, the voltage that is actually delivered to an integrated circuit in sensed. As described above, the voltage delivered by a power supply can vary over time. As the voltage varies, the frequency of the clock used to operate the integrated circuit may have to be changed in order to avoid timing failures. Stage 102 illustrates that the basic method determines an appropriate frequency to provide to the integrated circuit. Typically, this frequency is derived directly from the delivered voltage. Lastly, the basic method provides to the integrated circuit the frequency determined to by appropriate in stage 103.

Figure 2:
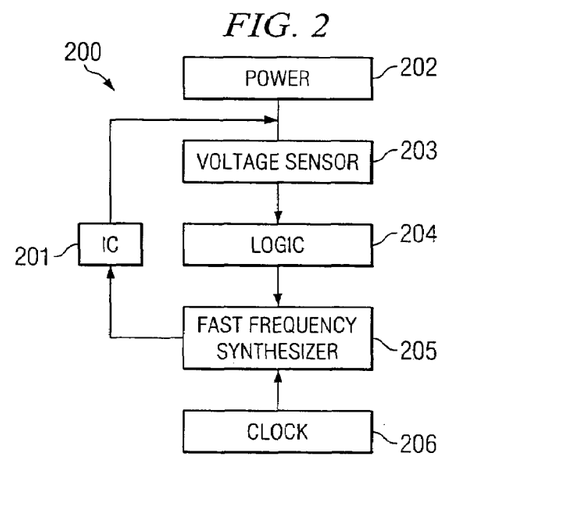
FIG. 2 is a circuit layout according to an embodiment of the present invention.

FIG. 2 depicts an example component layout of one embodiment of the present invention. System 200 is capable of addressing all of the above described problems in the art for the management of integrated circuit 201. Power supply 202 supplies a voltage to system 200. As described above, this voltage is likely to vary. Voltage sensor 203 senses the voltage that is delivered to integrated circuit 201. In the depicted embodiment, voltage sensor 203 provides information regarding the delivered voltage to logic block 204. Logic block 204, in the depicted embodiment, determines the frequency that is appropriate for integrated circuit 201 and provides this information to frequency synthesizer 205. Frequency synthesizer 205 alters the system clock 206 signal to correspond with the determined appropriate frequency. Those of ordinary skill in the art will appreciate that system 200 is an example arrangement, and that the embodiments of the present invention are not limited to the arrangement depicted.

Figure 3:
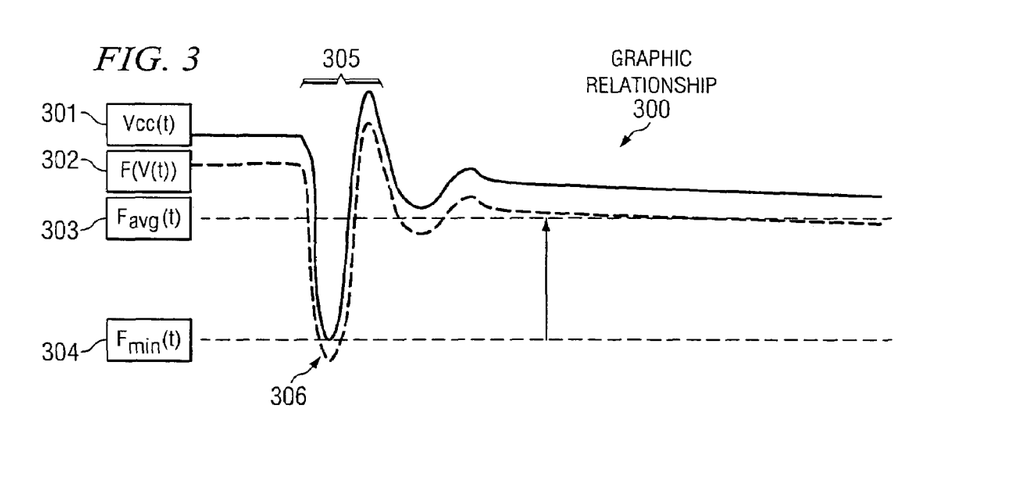
FIG. 3 is a graph illustrating some advantages of certain embodiments of the present invention.

FIG. 3 illustrates some advantages of the above embodiments. Graphic relationship 300 show a comparison between the delivered voltage 301, the frequency 302 provided by an embodiment of the present invention, the average frequency 303 provided by an embodiment of the present invention, and the frequency 304 allowed by prior art methods.

As described above, the delivered voltage 301 will likely vary, as seen by voltage deviation 305. Prior art solutions required that the provided frequency 304 be low enough to still be viable even at the minimum voltage 306. Some embodiments of the present invention are able to continuously sense the delivered voltage 301 and provide a frequency 302 that tracks the delivered voltage 301. Thus the average frequency 303, provided by these embodiments of the present invention is significantly higher than the frequency 304 allowed by prior art solutions.

Figure 4:
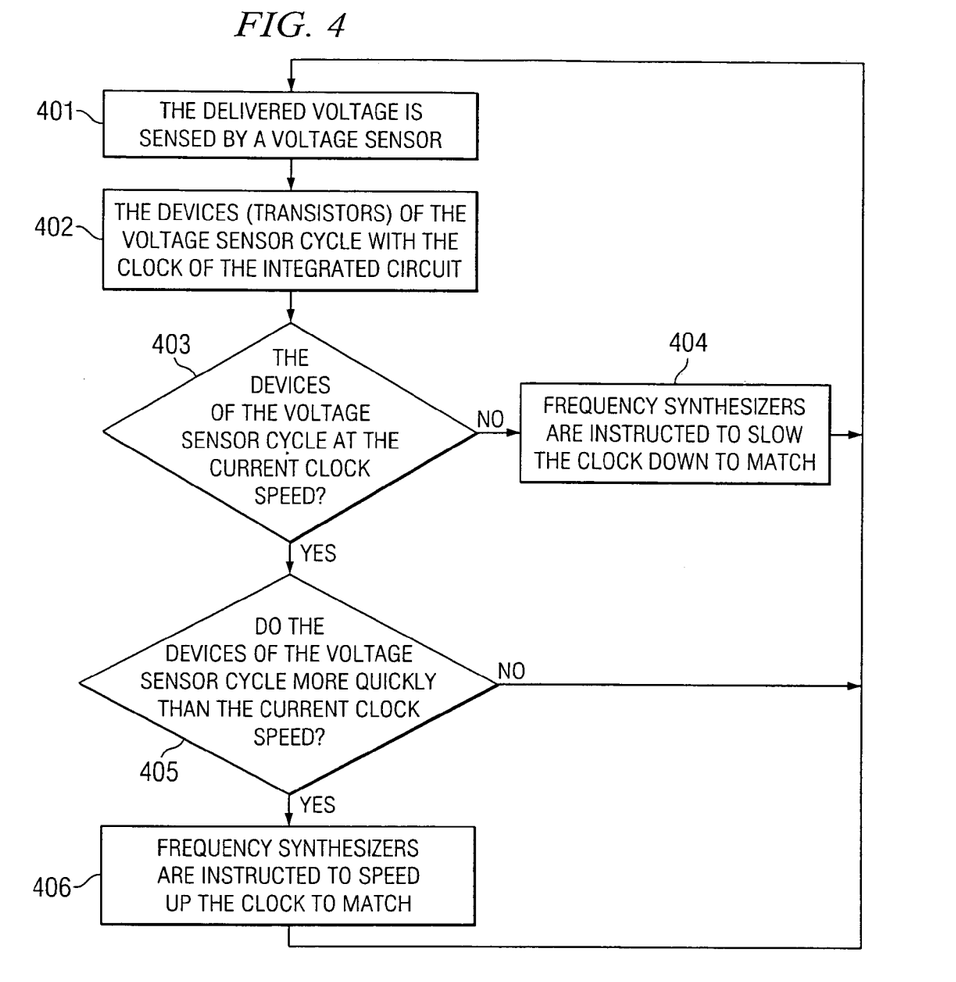
FIG. 4 is a flow chart of an embodiment of the present invention.

The embodiments of the present invention are not limited to one manner of voltage to frequency conversion. In one embodiment of the present invention, the voltage sensors measure the effect of the voltage on circuit speed. FIG. 4 is an example flow chart for an embodiment of this type. Method 400 illustrates, generally, how such an embodiment can use switching speed. The delivered voltage is sensed in stage 401. In such an embodiment, the delivered voltage would then be applied 402 to test devices (such as transistors) that may be part of the voltage sensor. The voltage sensor then determines 403 if the test devices are able to cycle at the currently provided clock frequency. If not, the frequency synthesizer instructs 404 to slow the provided frequency in order to compensate. If the test devices can cycle at the currently provided frequency, the depicted method determines 405 if the test devices are capable of cycling at a rate faster than the provided frequency. If so, the frequency synthesizer is instructed 406 to raise the frequency accordingly. If not, the currently provided frequency is unchanged.

In one embodiment using this method, the voltage sensor contains a plurality of VLSI transistors that are implemented as gates. These transistors are specifically chosen to be of a length and propagation time delay that will represent the limits of the VLSI circuit on which the embodiment has been implemented. Thus, when the delay through the sensor transistors equals the cycle time of the instantaneous frequency on the integrated circuit, the integrated circuit is operating efficiently. If the voltage drops, the transistors in the voltage sensor will slow down (take longer to propagate than the cycle time). This indicates that the cycle time is too short and that frequency should be reduced in order to avoid a timing failure. Conversely, if the voltage rises, the propagation of the sensor transistors is faster than one clock cycle, and frequency can be safely increased.

Figure 5:
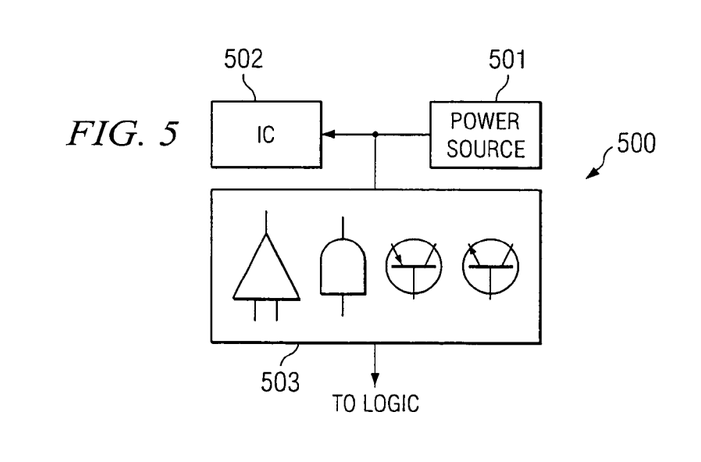
FIG. 5 is a circuit layout according to an embodiment of the present invention.

FIG. 5 depicts an example voltage sensor that could be used with the above embodiments. Sensor 500 is connected to the power line supplying power from power source 501 to integrated circuit 502. Test devices 503 comprise sensor 500. These devices may be implemented as gates, simple transistors, or other components. Information regarding switching speed of these components is then transferred to a logic block.

Figure 6:
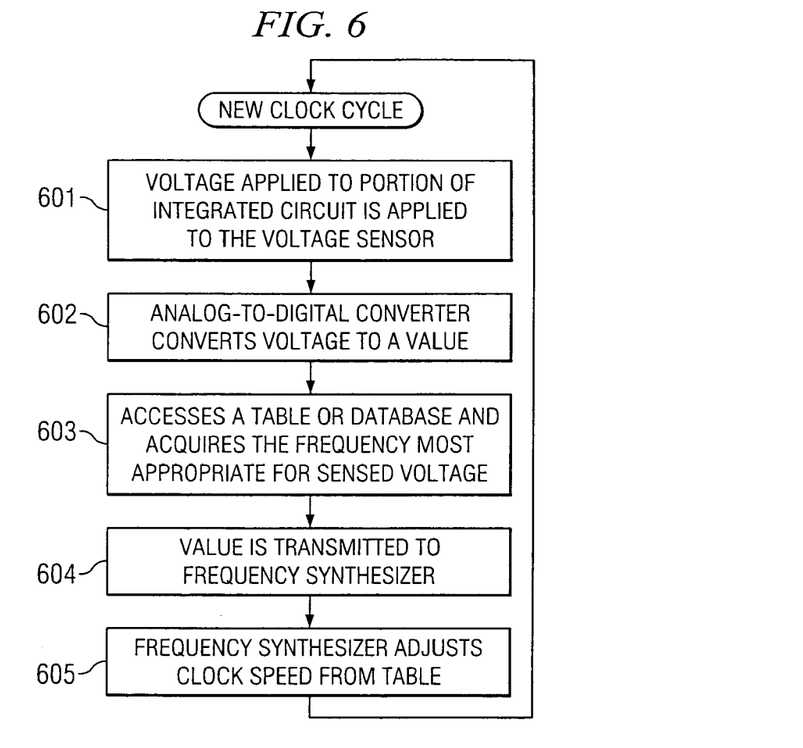
FIG. 6 is a flow chart of an embodiment of the present invention.

Other embodiments of the present invention may use an analog to digital converter to actually measure the value of the delivered voltage. This measured number can then be used by indexing a table. FIG. 6 shows an example flow chart depicting a method that may be implemented by certain embodiments of the present invention. The delivered voltage is applied 601 to a voltage sensor. This voltage is converted 602 to a numeric value, by a analog-to-digital converter for example. Then the embodiment may access 603 a table or database that associates voltage values with appropriate frequencies, and transmit 604 the frequency associated with the delivered voltage to a frequency synthesizer. The synthesizer can then adjust 605 the clock frequency to match. For example, if the delivered voltage is measured as 1.4 volts, an embodiment could index a table that showed 1.4 volts could sustain 1.9 GHz. 1.9 GHz is then sent to the frequency synthesizer as the new frequency. During the next clock cycle, the process could repeat. If 1.42 volts is measured in the next cycle, the table could be indexed again, the appropriate frequency re-determined, and the new frequency (for example, 1.93 GHz) sent to the synthesizer.

Temperature effects can also cause devices to run faster or slower than the designer anticipated value. In a hot environment, devices tend to slow down. Embodiments such as those describe by FIG. 6 may require guardbanding to account for inaccuracies in a table or database brought about by temperature. However, embodiments such as those described by FIG. 4 can have transistors in the sensor to determine how fast an integrated circuit can run at a given voltage that experience the same physical conditions, such as temperature, the integrated circuit as a whole is experiencing. Because the detector transistors will slow as the temperature rises in the same manner as the devices in the integrated circuit, no additional correction is needed.

Figure 7:
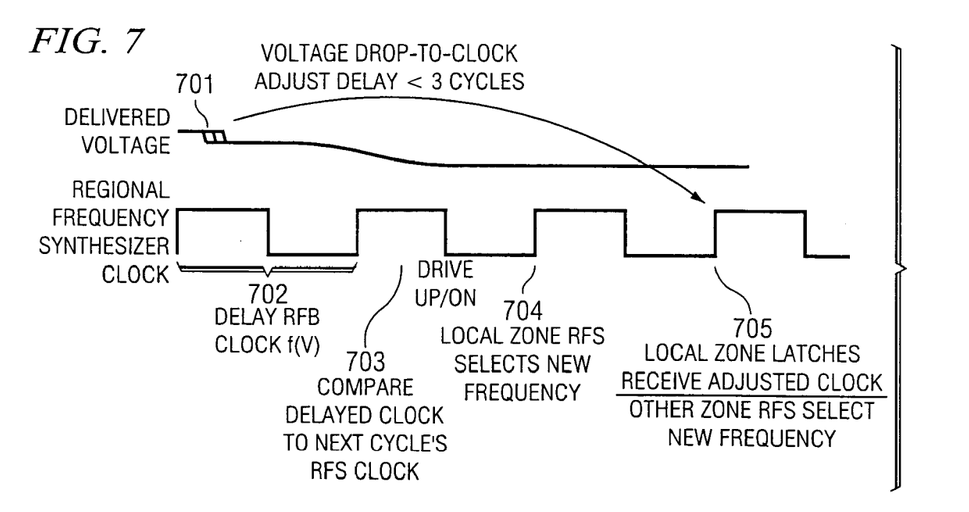
FIG. 7 is a chart of timing relationships.

FIG. 7 is a timing diagram of the activities in the response loop. It shows a voltage drop 701 and how the regional voltage detectors slow down 702 in response to that drop 701. It further shows where that slow down is detected 703, how that information gets communicated back to the frequency synthesizer 704, and how the frequency synthesizers change the frequency that is seen subsequently at the components of the integrated circuit 705. Of course, the change in frequency is only useful when it is actually seen by the components on the integrated circuit that use the clock. With sudden changes in power consumption, steep voltage drops are seen. The faster the frequency changes in response to the voltage, the more efficient the system becomes. Ideally, frequency will remain very close to the maximum supported by the voltage. Some embodiments of the present invention incorporate voltage sensors that compare cycle time and synthesizers to supply the appropriate frequency. As a result, a system is provided where frequency follows along behind voltage, allowing the voltage to change freely based upon the power needs.

Figure 8:
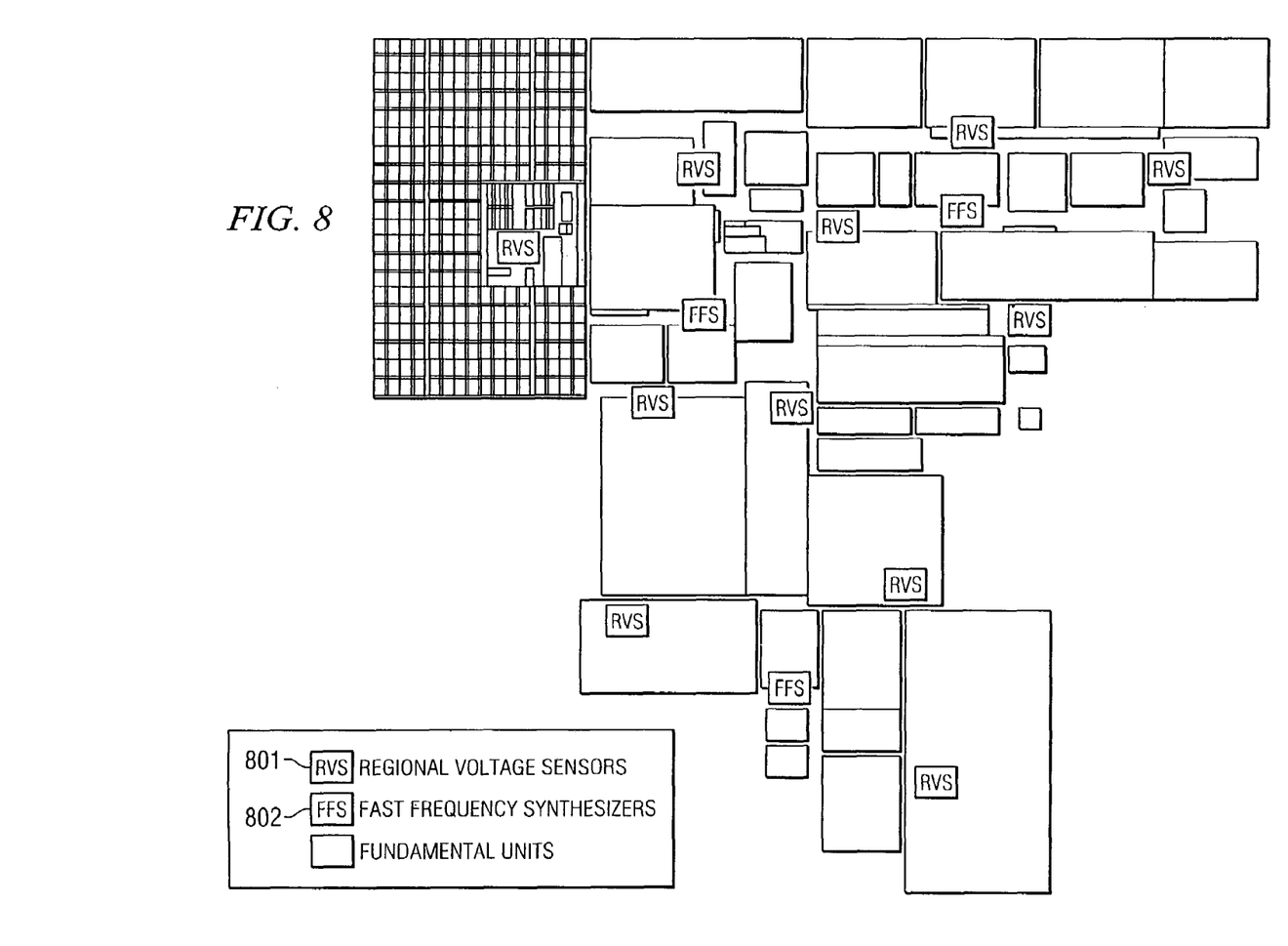
FIG. 8 is a circuit floor plan in accordance with an embodiment of the present invention.

Many embodiments will find it advantageous to distribute multiple voltage sensors in several regions of an integrated circuit. Those of ordinary skill in the art will appreciate that the embodiments of the present invention are not limited to a single implementation of the arrangements depicted above. Some embodiments may have multiple voltage detectors, distributed as regional voltage detectors, as well as multiple frequency synthesizers. FIG. 8 shows where the regional voltage detectors are and where the frequency synthesizers are located in one embodiment. Regional voltage sensors 801 are distributed across VLSI (Very Large Scale Integration) integrated circuit 800. These sensors 801 are able to sense the delivered voltage to a portion of VLS integrated circuit 800, and by means of frequency synthesizers 802, alter the frequency to different positions of the integrated circuit.

The frequency synthesizers 802 in some embodiments of the present invention can have the ability to "talk" to each other. If one frequency synthesizer 802 senses a voltage drop, i.e. the regional voltage detectors indicate a need to slow down, the frequency synthesizer associated with those detectors slow down immediately. This regional slow down can then be communicated to the other frequency synthesizer allowing them to follow. Remote ones, however, may slow down one or more cycles later. But because it takes a non-zero amount of time for voltage disturbances to propagate across the integrated circuit, the delay in slow down is inconsequential from an operational prospective. Thus, the clock frequency on a integrated circuit may not be universal, as it would be in a preemptive system, the frequency may have a time and location variance. Aspects of some embodiments may account for this. If one region of the integrated circuit sees a change in frequency that another region has not yet experienced, phase error may occur between the two. However, such errors are well known in the art of VLSI design, and one of ordinary skill in the art could easily adapt a specific VLSI design to compensate for such skew without undue experimentation.

Certain embodiments of the present invention utilize the concept of average frequency. As voltage is varying, these embodiments of the present invention push the frequency very close to maximum for the voltage. As a result, the frequency varies with respect to location and with respect to time. Thus, the performance of the integrated circuit (usually well correlated with operating frequency) is sustained at an average frequency substantially higher than the minimum frequency that is the maximum at which a prior art integrated circuit can safely operate. The difference between these two values and the benefit gained is illustrated in FIG. 3.

What is claimed is:

1. A method of circuit control, comprising:
   sensing a delivered voltage to a portion of an integrated circuit;
   determining an appropriate frequency for the portion of the integrated circuit; and
   providing the appropriate frequency to said portion of said integrated circuit.

2. The method of claim 1 wherein said sensing, determining, and providing are continuously repeated during the integrated circuit's operation.

3. The method of claim 1 wherein the appropriate frequency is a maximum frequency possible for the portion of the integrated circuit at the delivered voltage.

4. The method of claim 1 further comprising:
   applying the delivered voltage to constituent devices of a voltage sensor.

5. The method of claim 4 wherein the constituent devices are similar to devices comprising the portion of the integrated circuit.

6. The method of claim 4 further comprising:
   further determining a switching speed of the constituent devices at the delivered voltage.

7. The method of claim 6 further comprising:
   using the switching speed to determine the appropriate frequency.

8. The method of claim 4 further comprising:
   exposing the voltage sensor and the portion of the integrated circuit to the same physical conditions.

9. The method of claim 8 wherein the physical conditions include temperature.

10. The method of claim 1 further comprising:
    calculating a value for the delivered voltage.

11. The method of claim 10 further comprising:
    using a tabulation of a set of values for the appropriate frequency associated with a set of values for the delivered voltage to determine the appropriate frequency.

12. A device for electronic circuit control comprising:
    means for sensing a delivered voltage to one portion of an integrated circuit;
    means for determining an appropriate frequency for the portion of the integrated circuit; and
    means of providing the appropriate frequency to the portion of the integrated circuits, independent of frequencies provided to other portions of said integrated circuit.

13. The device of claim 12 further comprising:
    means for determining the maximum possible frequency for the portion of the integrated circuit at the delivered voltage.

14. The device of claim 12 wherein said sensing means further comprises:
    means for testing a switching speed of at least one test device at the delivered voltage.

15. The device of claim 14 wherein the at least one test device is similar to a circuit device comprising the portion of the integrated circuit.

16. The device of claim 14 further comprising:
    means for using the switching speed as the appropriate frequency.

17. The device of claim 14 wherein the at least one test device and the circuit device are exposed to similar physical conditions.

18. The device of claim 17 wherein the physical conditions include temperature.

19. The device of claim 12 further comprising:
    means for calculating a value for the delivered voltage.

20. The device of claim 19 wherein said calculating means includes analog-to-digital converter.

21. The device of claim 19 further comprising:
    means for associating the value of the delivered voltage with a value for the appropriate frequency.

22. The device of claim 21 wherein said associating means includes a tabulation of possible values for the delivered voltage associated with a set of values for the appropriate frequency.

23. A system for circuit control comprising:
    at least one voltage sensor to sense a delivered voltage to a portion of an integrated circuit;
    at least one logic block to determine an appropriate frequency from the delivered voltage for the portion of the integrated circuit; and
    at least one circuitry arrangement to provide the appropriate frequency to the portion of the integrated circuit.

24. The system of claim 23 wherein the logic block determines as the appropriate frequency, the maximum frequency possible for the portion of the integrated circuit at the delivered voltage.

25. The system of claim 23 further comprising: at least one test device to which the delivered voltage is applied.

26. The system of claim 25 at least one test device logic block to determine a switching speed of the at least one test device at the applied voltage.

27. The system of claim 26 wherein the switching speed is used to determine the appropriate voltage.

28. The system of claim 25 wherein the at least one test device is similar to a device that comprises the portion of the integrated circuit.

29. The system of claim 25 wherein the at least one test device and the portion of the integrated circuit are exposed to similar physical conditions.

30. The system of claim 29 wherein the physical conditions include temperature.

31. The system of claim 23 further comprising:
    a converter to convert the delivered voltage to a value.

32. The system of claim 31 wherein the converter is an analog-to-digital converter.

33. The system of claim 23 further comprising:
    a table of possible values for the delivered voltage associated with possible values for the appropriate frequency.

34. The system of claim 33 wherein said table is a computer readable database.

35. A system for circuit control comprising:
a plurality of voltage sensors arranged to sense a delivered voltage to different portions of an integrated circuit;
a plurality of logic blocks arranged to determine an appropriate frequency for each said portion from said delivered voltages; and
a plurality of circuitry arrangements to provide each said portion its associated appropriate frequency.

* * * * *

UNITED STATES PATENT AND TRADEMARK OFFICE
CERTIFICATE OF CORRECTION

PATENT NO. : 7,224,563 B2  Page 1 of 1
APPLICATION NO. : 10/651360
DATED : May 29, 2007
INVENTOR(S) : Samuel D. Naffziger

It is certified that error appears in the above-identified patent and that said Letters Patent is hereby corrected as shown below:

In column 2, line 44, delete "bums" and insert -- burns --, therefor.

In column 7, line 65, in Claim 12, delete "circuits" and insert -- circuit --, therefor.

Signed and Sealed this

Twelfth Day of August, 2008

JON W. DUDAS
*Director of the United States Patent and Trademark Office*